(12) United States Patent
White et al.

(10) Patent No.: US 9,522,580 B2
(45) Date of Patent: Dec. 20, 2016

(54) TIRE SPOON SURFACE PROFILE AND METHOD OF MAKING

(75) Inventors: Michael White, Montgomery City, MO (US); Robert Jensen, Clarks Grove, MN (US); Larry Betcher, Northfield, MN (US)

(73) Assignee: BOSCH AUTOMOTIVE SERVICES SOLUTIONS INC., Warren, MI (US)

( * ) Notice: Subject to any disclaimer, the term of this patent is extended or adjusted under 35 U.S.C. 154(b) by 829 days.

(21) Appl. No.: 13/369,020

(22) Filed: Feb. 8, 2012

(65) Prior Publication Data

US 2013/0199733 A1    Aug. 8, 2013

(51) Int. Cl.
*B60C 25/04*    (2006.01)
*B60C 25/02*    (2006.01)

(52) U.S. Cl.
CPC ..................... *B60C 25/02* (2013.01)

(58) Field of Classification Search
CPC ........ B60C 25/142; B60C 25/02; B60C 25/04; B60C 25/132; B60C 25/14; B67B 7/16; B67B 7/403; B67B 7/14; B67B 7/44; B25C 11/00; B66F 15/00; E01B 29/26
USPC ...... 157/1.3, 1.17, 1.22; 81/15.2, 15.3, 3.55, 81/3.57; 254/25
See application file for complete search history.

(56) References Cited

U.S. PATENT DOCUMENTS

| | | | | |
|---|---|---|---|---|
| 1,385,948 A | * | 7/1921 | Norlund | ........................ 157/1.3 |
| 2,634,803 A | * | 4/1953 | Obee | ...................... B60C 25/04 157/1.22 |
| 5,343,921 A | * | 9/1994 | Kusner | ................... B60C 25/02 157/1.3 |
| 5,806,578 A | * | 9/1998 | Gonzaga | ................. B60C 25/02 157/1.3 |
| 6,488,266 B2 | * | 12/2002 | Macor | ............................ 254/25 |
| 6,684,927 B1 | * | 2/2004 | Kliskey | .................. B60C 25/02 157/1.17 |
| 6,712,114 B2 | * | 3/2004 | Kliskey | .................. B60C 25/02 157/1.1 |
| 7,163,041 B1 | * | 1/2007 | Tran | ....................... B60C 25/02 157/1.1 |
| 7,267,155 B2 | * | 9/2007 | Brahler, II | ............. B60C 25/02 157/1.17 |
| 2006/0179978 A1 | * | 8/2006 | Rocks | ............................ 81/3.55 |
| 2007/0240830 A1 | * | 10/2007 | Werner | ......................... 157/1.3 |
| 2008/0029223 A1 | * | 2/2008 | Kliskey | ........................ 157/1.33 |

(Continued)

FOREIGN PATENT DOCUMENTS

DE    19626607    9/1997

OTHER PUBLICATIONS

Ken-Tool Wherever Tires Are Changed, Catalog KT 0411, www.kentool.com.

*Primary Examiner* — Hadi Shakeri
(74) *Attorney, Agent, or Firm* — Baker & Hostetler LLP

(57) ABSTRACT

A tire spoon may be provided. The tire spoon may include: a bar; and a spoon portion at one end of the bar, the spoon portion having two outer side edges and a middle portion located between the two outer side edges, and at a given cross section of the spoon portion, the middle portion cross sectional thickness is greater than a cross sectional thickness of the two outer side edges. A method of forming a tire spoon is provided. The method may include: providing a spoon portion on an end of a bar; and forming the spoon portion to have middle section that has a thicker cross section than either side portion of the spoon portion.

16 Claims, 5 Drawing Sheets

(56) References Cited

U.S. PATENT DOCUMENTS

2011/0296955 A1* 12/2011 Silvers et al. ................ 81/3.09

* cited by examiner

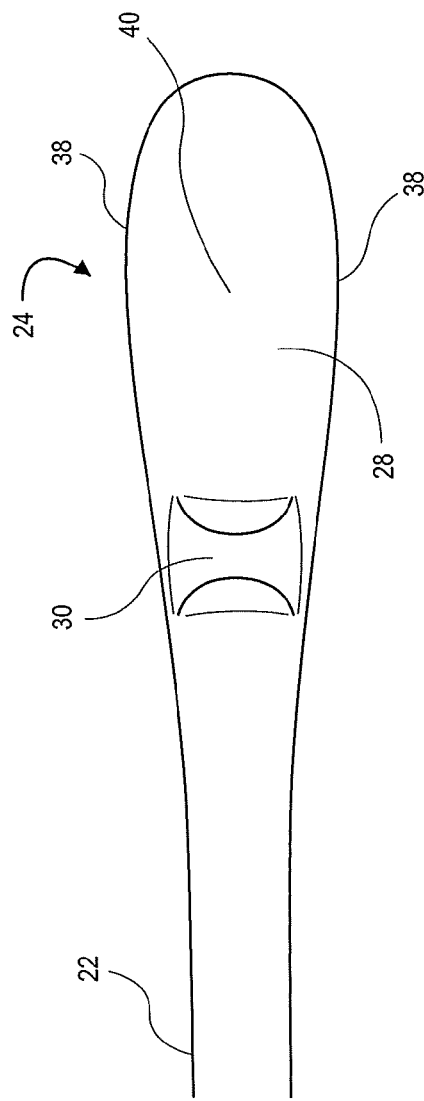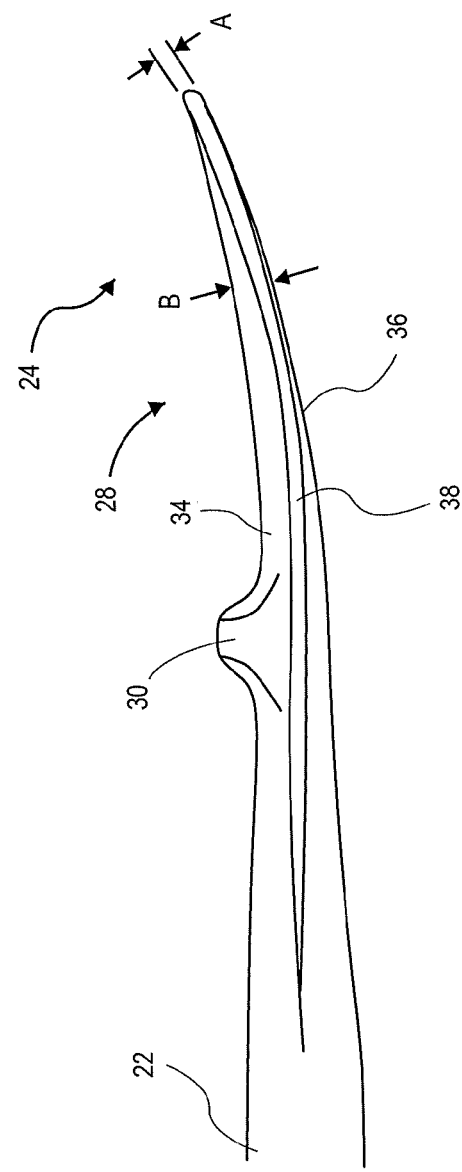

TIRE SPOON SURFACE PROFILE AND METHOD OF MAKING

FIELD OF THE INVENTION

The present invention relates generally to a tool for installing and removing pneumatic rubber tires on wheel rims. More particularly, the present invention relates to a cross sectional profile of a tire spoon used to install and remove tires from wheel rims.

BACKGROUND OF THE INVENTION

Installing and removing tires from wheel rims is a common task performed by auto and truck mechanics. Modern tires may be difficult to install or remove from tire rims as modern tires have increasingly stiff side walls, which must be flexed in to order for the tires to fit over the wheel rim.

Several tools are used by mechanics to perform this task. One common tool is referred to as a tire spoon. Current tire spoons include rods or bars which may be used to provide a handle for the user to provide leverage for the spoon portion located at the end of the rod or bar. The spoon portion of typical tire spoons have flat surface profiles on the top and bottom of the tire spoon portions. These flat surface profiles can maximize surface contact between the tire and the wheel rim resulting in the tool sticking when it is used to remove a rubber tire from the wheel rim. In order to remove the tool from between the tire and the wheel rim, operators must twist, rotate, pull or push the tool.

Accordingly, it is desirable to provide an apparatus or method which makes it easier to remove or manipulate a tire spoon when it is positioned between the tire and the wheel rim.

SUMMARY OF THE INVENTION

The forgoing needs are met, to a great extent, by the present invention, wherein one aspect an apparatus is provided that in some embodiments a tool and/or method is provided that allows an operator to more easily manipulate a tire spoon when the tire spoon is located between the tire and a wheel rim.

In accordance with one embodiment of the present invention, a tire spoon may be provided. The tire spoon may include: a bar; and a spoon portion at one end of the bar, the spoon portion having two outer side edges and a middle portion located between the two outer side edges, and at a given cross section of the spoon portion, the middle portion cross sectional thickness is greater than a cross sectional thickness of the two outer side edges.

In accordance with another embodiment of the present invention, a method of forming a tire spoon is provided. The method may include: providing a spoon portion on an end of a bar; and forming the spoon portion to have middle section that has a thicker cross section than either side portion of the spoon portion.

In accordance with yet another embodiment of the present invention, a tire spoon may be provided. The tire spoon may include: means for levering; and means for wedging attached at one end of the means for levering, wherein the means for wedging is thicker in a center portion then at side portions.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a top view of a spoon portion of the tire spoon tool shown in FIG. 1.

FIG. 5 is a side view of the spoon portion shown in FIG. 4.

DETAILED DESCRIPTION

Figure 1:
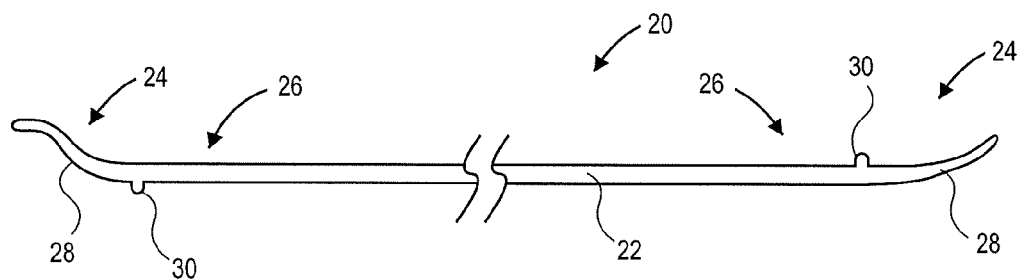
FIG. 1 is a side view of a tire spoon tool in accordance with an embodiment of the invention.

The invention will now be described with reference to the drawing figures, in which like reference numerals refer to like parts throughout. An embodiment in accordance with the present invention provides a tire spoon tool having an improved tire spoon profile to reduce friction between the tire spoon, the tire and the wheel rim when the tire spoon tool is located between the wheel and the tire.

An embodiment in accordance with the invention is illustrated in FIG. 1. FIG. 1 shows a tire spoon tool 20 having a shaft or bar 22. The shaft or bar 22 may have a round, square, oval or any other suitable cross sectional shape. The shaft or bar 24 is terminated by spoon portions 24. The spoon portions 24 are fit onto the ends 26 of the shaft or bar 22.

In some embodiments in accordance with the invention, the spoon portion 24 and the shaft or bar portion 22 are integral and comprised of a single material such as steel. However, in another embodiments are the materials may be used. Further, in another embodiments the spoon portion 24 and the shaft or bar 22 may not be made of the same material, but rather the spoon portion 24 is attached to the end 26 of the shaft or bar 22.

The shaft or bar 22 provides a handle for the user to use. The length of the shaft or bar 22 provides a lever for the user to exercise leverage for manipulating the spoon portion 24 when the spoon portion 24 is placed between the tire and wheel rim.

The spoon portions 24 include flat portion 28 that is relatively flat in comparison to the shaft or bar 22 and a projection 30. It will be understood that the flat portion 28 is not perfectly flat but it may have contors that will be described further below. The term "flat portion" is intended refer to the portion of the tire spoon tool 20 that is wider and thinner (thus "flatter") than the shaft or bar portion 22.

The projection 30 may be used in some embodiments to reduce the likelihood of the spoon portion 24 to extend too far in between a wheel rim and a tire.

As shown in FIG. 1, the two spoon portions 24 are not identical but have different shapes. In some embodiments of the invention, a tire spoon tool 20 may have similar spoons portions 24 located on either end 26 of the shaft or bar 22 or, as shown in FIG. 1, each end 26 may be equipped with a different type of spoon portion 24. The spoon portions 24 shown in and described herein are merely intended to be exemplary and are not limited in any way by the embodiments shown.

Figure 2:
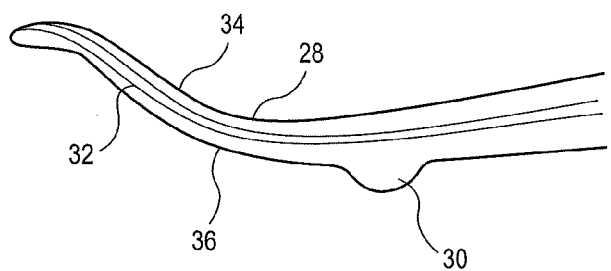
FIG. 2 is a side view of a spoon portion of the tire spoon tool shown in FIG. 1.
Figure 3:
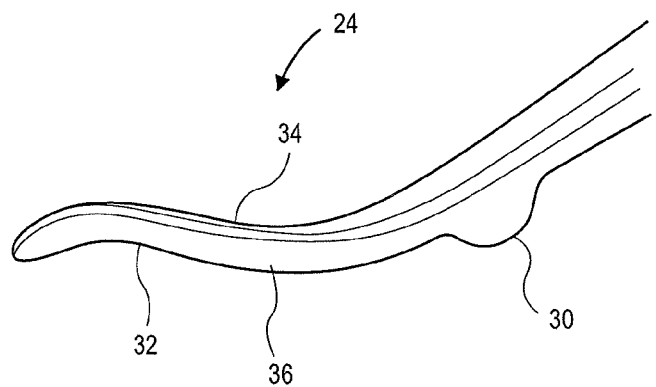
FIG. 3 is a perspective view of the spoon portion shown in FIG. 2.

FIGS. 2-3 illustrate an example spoon portion 24 shown on the left-hand side of the tire spoon tool 20 illustrated in FIG. 1. As shown in FIGS. 2-3, the spoon portion 24 has a general "S" shape. The spoon portion 24 includes a top portion 34 and a bottom portion 36. The terms top and bottom are used with reference to the figures and are merely intended to explain which portion of the spoon portion 24 is being referred to in the figures.

FIGS. 4-5 are top and side views respectively of the spoon portion 24 illustrated on the right side of FIG. 1. The spoon portion 24 includes the flat portion 28 located on the opposite side of projection 30 than the shaft or bar portion 22. The spoon portion 24 includes two side portions 38 and a middle or center portion 40. The projection 30 project upwards from the top portion 34 in contrast to the projection 30 which extends downward projecting from the bottom portion 36 as shown in FIGS. 2-3.

As illustrated in FIG. 5, the side portions 38 have the thickness illustrated by arrows A and the middle or center portion 40 has a thickness illustrated by arrows B and the middle or center portion 40 is thicker than the thickness of the side portions 38. In some embodiments of the invention, the flat portion 28 has contors of various thickness in order to disrupt the continuity of the tire spoon surface profile. A disruption of the continuity of the surface profile aids in reducing the likelihood of the tire spoon 24 from sticking when located in between a tire and wheel rim.

Figure 6:
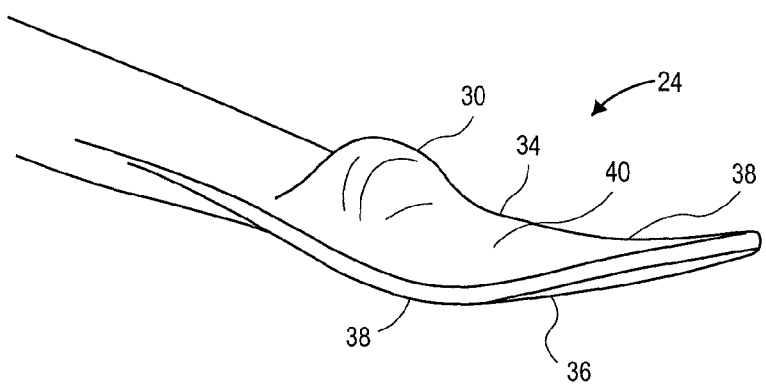
FIG. 6 is a perspective view of a spoon portion in accordance with an embodiment of the invention.

FIG. 6 is a perspective view of the tire spoon 24 illustrated in FIGS. 4-5. In FIG. 6, the projection 30 extends upwardly from the top portion 34 of tire spoon 24. The middle or center portion 40 is thicker than the side portions 38. The bottom portion 36 can also partially be seen in FIG. 6.

Figure 7:
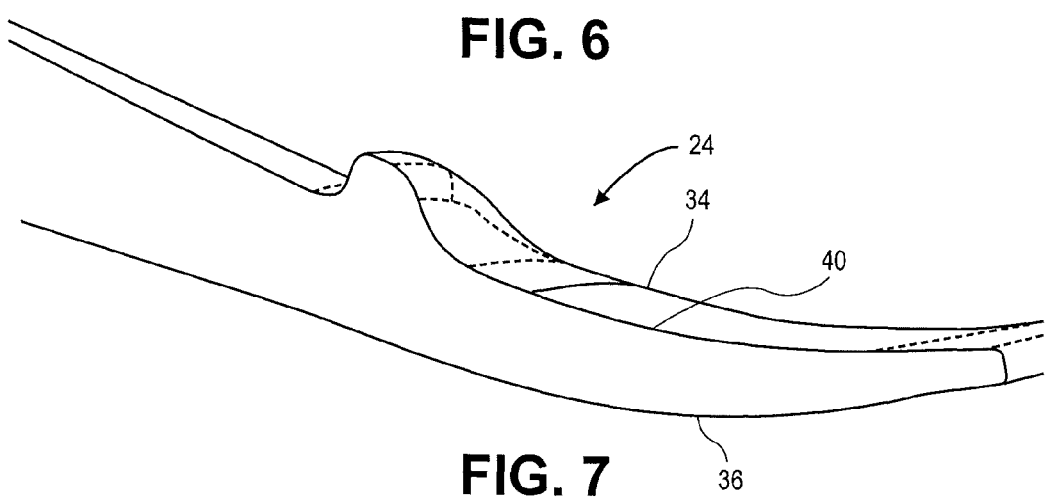
FIG. 7 is a perspective cross sectional view of a spoon portion in accordance with an embodiment of the invention.

FIG. 7 is a perspective partial cross sectional view of a spoon portion 24 in accordance with an embodiment of the invention. The cross section was taken along the middle or center portion 40. The top 34 and bottom 36 portions can also be seen.

Figure 8:
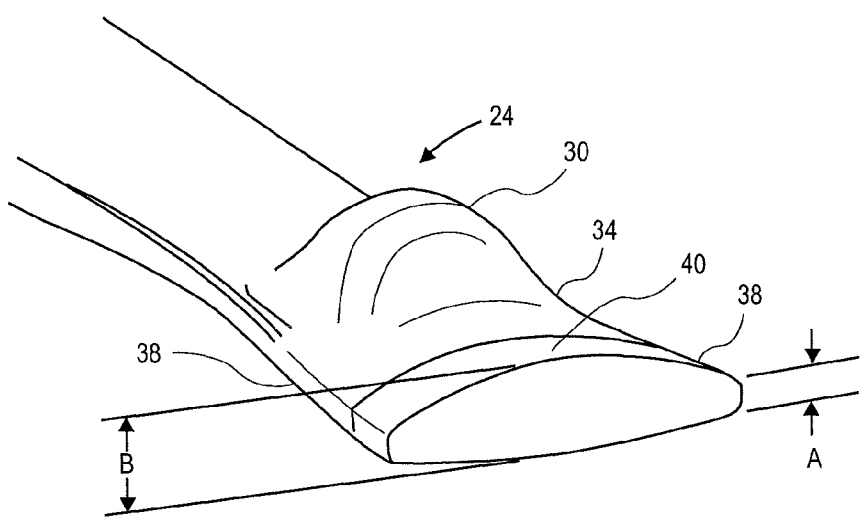
FIG. 8 is a perspective cross sectional view of a spoon portion in accordance with an embodiment of the invention.

FIG. 8 is perspective partial cross sectional view of a spoon portion 34 in accordance with an embodiment of the invention. The projection 30 can be seen projecting above the top surface 34. The relative thicknesses between the side portions 38 and the middle or center portion 40 can readily be seen. Arrows A illustrate the thickness of the side portions 38 and Arrows B illustrate the thickness of the middle or center portion 40. As can be seen in FIG. 8, the thickness illustrated by Arrows B is much thicker than the thickness illustrated by Arrows A.

FIGS. 9-14 illustrates cross sectional views of the spoon portion 24 in various examples and embodiments.

Figure 9:
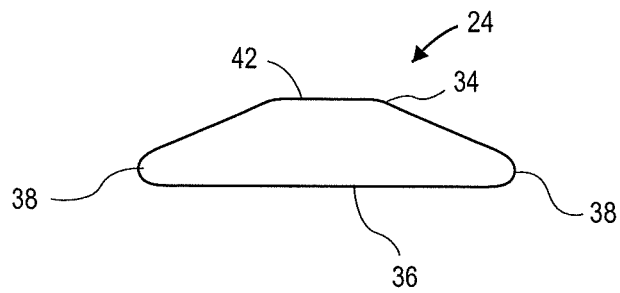
FIG. 9 is a cross sectional view of spoon portion in accordance with an embodiment of the invention.

FIG. 9 illustrates a cross sectional area of a spoon portion 24 in an embodiment having a relatively flat bottom section 36 and angled top section 34. The angled top section 34 moves up from the side portions 38 to a relatively flat top 42.

Figure 10:
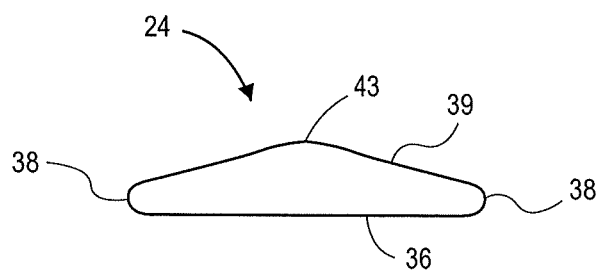
FIG. 10 is a cross sectional view of a spoon portion in accordance with an embodiment of the invention.

FIG. 10 illustrates a cross section of a spoon portion 24 in an embodiment. The top portion 34 goes up from the side portions 34 to a rounded top 43. The bottom portion 36 is relatively flat.

Figure 11:
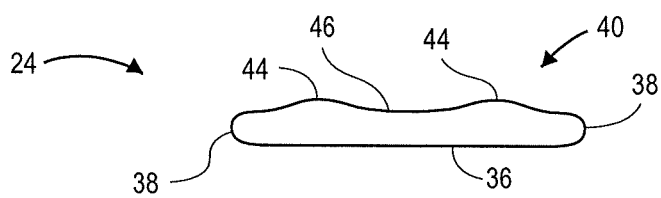
FIG. 11 is a cross sectional view of spoon portion in accordance with an embodiment of the invention.

FIG. 11 shows a cross section of a spoon portion 24 according to another embodiment of the invention. The bottom portion 36 is relatively flat. The side portions 38 have a smaller cross sectional thickness than the peaks 44. Between the peaks 44 is a valley 46.

Figure 12:
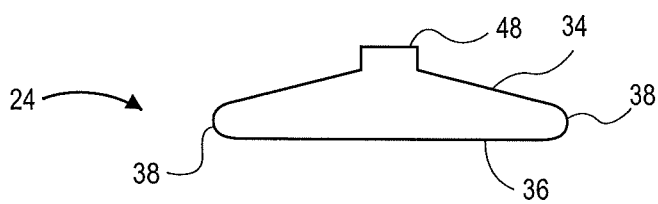
FIG. 12 is a cross sectional view of spoon portion in accordance with an embodiment of the invention.

FIG. 12 shows a cross sectional area of a spoon portion 24 in accordance with another embodiment of the invention. As shown in FIG. 12, the bottom portion 36 is relatively flat. The top 34 slopes upwardly from the side portions 38 to a top projection 48.

Figure 13:
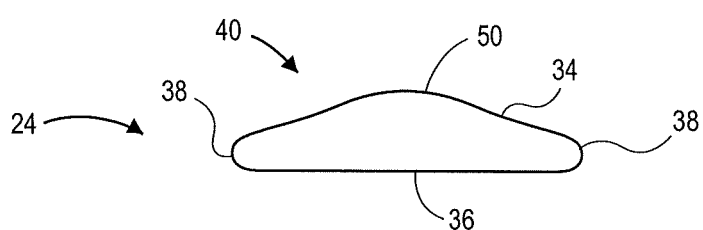
FIG. 13 is a cross sectional view of spoon portion in accordance with an embodiment of the invention.

FIG. 13 is a cross sectional view of a spoon portion 24 according to another embodiment of the invention. The bottom portion 36 is relatively flat. The top portion 34 slopes generally upward from the side portions 38 to a rounded dome top 50. The cross sectional view shown in FIG. 13 is similar to that shown in FIG. 10, however rounded dome top 50 is more gently sloped than the rounded top 43 shown in FIG. 10.

Figure 14:
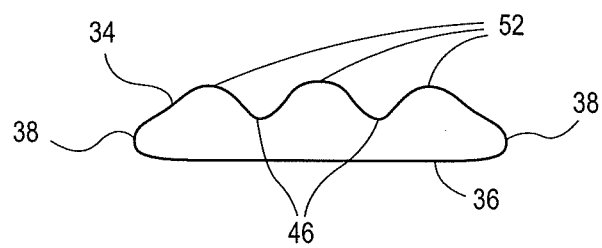
FIG. 14 is a cross sectional view of spoon portion in accordance with an embodiment of the invention.

FIG. 14 illustrates a cross sectional view of a spoon portion 24 in accordance with another embodiment of the invention. Spoon portion 24 includes a relatively flat bottom 36. The top portion 34 slopes up from the side portions 38 to peaks 52. In between the peaks 52, are valleys 46.

FIGS. 11 and 14 illustrate embodiments where the thicker center or middle portions 40 are not located exactly in the middle between the side portions 38. It should be noted that the middle or center portion 40 is between the side portions 38 but a discontinuously in the surface of the tire spoon portion 24 is not necessarily in the geometric center between the side portions 38.

Figure 15:
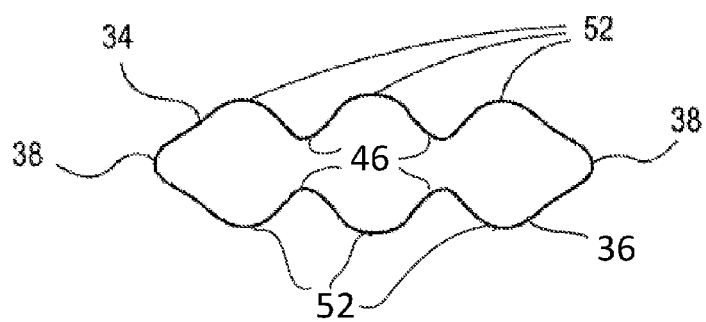
FIG. 15 is a cross-sectional view of a spoon portion in accordance with an embodiment of the invention.

FIG. 15 illustrates a cross-sectional view of a spoon portion 24 in accordance with another embodiment of the disclosure. In one aspect, the peaks 52 and valleys 46 shown in FIG. 14 may be on both the top portion 34 and the bottom portion 36.

While the embodiments shown in FIGS. 9-14, show generally flat bottom portions 36. Other embodiments may have bottom portions 36 having other profiles than the flat one shown in FIGS. 9-14. For example, the bottom portion 34 may be a mirror image of the top portion 34 or may have other profiles as shown in FIGS. 5-8. Other cross sectional profiles might also be used in accordance with the invention.

As discussed above, by having irregular and unusual surface profiles, the spoon portion 24 is less likely to bind and get stuck in between the tire and wheel rim during a tire installation or a removing procedure onto a wheel rim.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tire spoon comprising:
a bar;
a first spoon portion at a first end of the bar, the first spoon portion having a top portion, a bottom portion, two outer side edges and a middle portion located between the two outer side edges, and at a given cross section of the first spoon portion, the middle portion's cross sectional thickness is greater than a cross sectional thickness of the two outer side edges;
a first projection arranged between the bar and the first spoon portion, the first projection extending upwards from the top portion of the first spoon portion;
a second spoon portion at a second end of the bar that is opposite the first end of the bar, the second spoon portion having a top portion, a bottom portion, two outer side edges and a middle portion located between the two outer side edges, and at a given cross section of the second spoon portion, the middle portion's cross sectional thickness is greater than a cross sectional thickness of the two outer side edges; and
a second projection extending downwards from the bottom portion of the second spoon portion, wherein
the top portion of the first spoon portion, the top portion of the second spoon portion, the bottom portion of the first spoon portion, and the bottom portion of the second spoon portion slope to form multiple peaks and multiple valleys that run generally parallel to the bar.

2. The tire spoon of claim 1, wherein therein the first spoon portion is generally shaped such that the top portion is curved from a connecting portion of the first spoon portion that connects the bar to an end of the first spoon portion.

3. The tire spoon of claim 2, wherein a bottom surface of the first spoon portion is curved from the connecting portion of the first spoon portion that connects to the bar to the end of the first spoon portion.

4. The tire spoon of claim 1, wherein a cross sectional thickness of the peaks are thicker than the cross sectional thickness of the two outer side edges.

5. The tire spoon of claim 1, wherein the tire spoon is steel.

6. The tire spoon of claim 1, wherein the bar and the first spoon portion are continuous.

7. The tire spoon of claim 1, wherein the thickness of the cross-sectional area of the first spoon portion is thickest in a center portion.

8. The tire spoon of claim 1, wherein the bar is configured to be a handle.

9. A method of forming a tire spoon comprising:
providing a first spoon portion on an end of a bar, the first spoon portion having a top portion, a bottom portion, and two side portions;
providing a second spoon portion at another end of the bar, the second spoon portion having a top portion, a bottom portion, and two side portions;
forming the first spoon portion to have a middle section that has a thicker cross section than either side portion of the first spoon portion;
forming a first projection arranged between the bar and the first spoon portion, the first projection projecting upward from the top portion of the first spoon portion;
forming the second spoon portion to have a middle section that has a thicker cross section than either side portion of the second spoon portion; and
forming a second projection arranged between the bar and the second spoon portion, wherein
the top portion of the first spoon portion, the top portion of the second spoon portion, the bottom portion of the first spoon portion, and the bottom portion of the second spoon portion slope to form multiple peaks and multiple valleys that run generally parallel to the bar.

10. The method of claim 9, wherein a cross sectional area of the first spoon portion is thickest at a center of the first spoon portion.

11. A tire spoon comprising:
a shaft having a round cross-sectional shape, the shaft comprising:
a first spoon portion on a first side of the shaft,
a second spoon portion on a second side of the shaft, and
a handle;
the first spoon portion and the second spoon portion each comprising a flat portion that is wider and thinner than the shaft and that has contours of varying thickness, each spoon portion comprising a projection in between the shaft and the flat portion, each spoon portion being a different material than the shaft, and each spoon portion being attached to the shaft; and
the first spoon portion and the second spoon portion each have a curved S-shape, each spoon portion comprising a top portion and a bottom portion, and each spoon portion further comprising two side portions and a center portion, wherein the center portion is thicker than the side portions and wherein the top portion and the bottom portion are mirror images of each other,
wherein the top portion of the first spoon portion, the bottom portion of the first spoon portion, the top portion of the second spoon portion, and the bottom portion of the second spoon portion slope to form multiple peaks and valleys that run generally parallel to the shaft.

12. The tire spoon of claim 11, wherein a cross sectional thickness of the peaks are thicker than the cross sectional thickness of the side portions.

13. The tire spoon of claim 11, wherein therein the first spoon portion is generally shaped such that the top portion is curved from a connecting portion of the first spoon portion that connects the shaft to an end of the first spoon portion.

14. The tire spoon of claim 11, wherein a bottom surface of the first spoon portion is curved from a connecting portion of the first spoon portion that connects to the shaft to an end of the first spoon portion.

15. The tire spoon of claim 11, wherein the shaft and the first spoon portion are continuous.

16. The tire spoon of claim 1, wherein the thickness of the cross-sectional area of the first spoon portion is thickest in a center portion.

\* \* \* \* \*